United States Patent
Mott et al.

[19]

[11] Patent Number: 5,868,168
[45] Date of Patent: Feb. 9, 1999

[54] PULSATION DAMPENER DIAPHRAGM

[75] Inventors: Keith C. Mott; Clifton T. Pursell, both of Houston, Tex.

[73] Assignee: Hydril Company, Houston, Tex.

[21] Appl. No.: 905,850

[22] Filed: Aug. 4, 1997

[51] Int. Cl.⁶ .................................................. F16L 55/04
[52] U.S. Cl. ................................. 138/31; 138/30; 138/26; 220/721
[58] Field of Search ................................. 138/30, 26, 31; 220/720, 721

[56] References Cited

U.S. PATENT DOCUMENTS

| | | | |
|---|---|---|---|
| 3,442,293 | 5/1969 | Erdmann | 138/30 |
| 3,674,053 | 7/1972 | Murman et al. | |
| 4,099,545 | 7/1978 | Zahid | |
| 4,108,209 | 8/1978 | Zahid | 138/30 |
| 4,178,965 | 12/1979 | Zahid | |
| 4,186,776 | 2/1980 | Burton | |
| 4,195,668 | 4/1980 | Lewis | |
| 4,214,611 | 7/1980 | Takacs et al. | 138/30 |
| 4,298,029 | 11/1981 | Zahid | |
| 4,298,030 | 11/1981 | Mercier | 138/30 |
| 4,299,253 | 11/1981 | Burton | |
| 4,305,428 | 12/1981 | Burton | |
| 4,307,753 | 12/1981 | Dryer | |
| 4,335,751 | 6/1982 | Sugimura et al. | 138/30 |
| 4,355,662 | 10/1982 | Floyd | |
| 4,407,330 | 10/1983 | Fujiwara | |
| 4,427,029 | 1/1984 | Charney et al. | |
| 4,442,866 | 4/1984 | Loukonen | |
| 4,445,829 | 5/1984 | Miller | |
| 4,497,388 | 2/1985 | Dexter | |
| 4,548,240 | 10/1985 | Graham | |
| 4,552,182 | 11/1985 | Graham | |
| 4,712,584 | 12/1987 | Pareja | |
| 4,721,444 | 1/1988 | Pareja | |
| 4,732,175 | 3/1988 | Pareja | |
| 4,759,387 | 7/1988 | Arendt | |
| 4,777,983 | 10/1988 | Steveley | 138/30 |
| 4,793,381 | 12/1988 | Sugimura | 138/30 |
| 4,836,409 | 6/1989 | Lane | |
| 4,949,750 | 8/1990 | Goodwin et al. | |
| 5,027,859 | 7/1991 | Sugimura | 138/30 |
| 5,036,879 | 8/1991 | Ponci | |
| 5,265,645 | 11/1993 | Goodwin | |
| 5,456,787 | 10/1995 | Myles | 138/30 X |

OTHER PUBLICATIONS

Hydril Catalog 9302–A: Hydro–Pneumatic Accumulators—Applications, Selection, Installation.

*Primary Examiner*—Patrick F. Brinson
*Attorney, Agent, or Firm*—Rosenthal & Osha L.L.P.

[57] ABSTRACT

The invention provides an improved pipeline pulsation dampener, including a pressure vessel divided by a diaphragm of elastomeric material into first and second pressure zones. The first pressure zone is connected to a pipeline and receives any undesired pressure changes in the pipeline through a first flow passage in the pressure vessel, while the second pressure zone receives a second fluid at a preselected pressure. The diaphragm has a reinforcing insert for bridging the first flow passage to support the diaphragm when the pressure of the second fluid in the second pressure zone exceeds the pressure of the first fluid in the first pressure zone to restrain the diaphragm from extruding through the first flow passage. The reinforcing insert is encased in the elastomeric material of the diaphragm to prevent the insert and the bond between the elastomeric material and the insert from being exposed to the fluid being pumped. In this manner, the bond is protected against corrosion or flow erosion by the first fluid.

4 Claims, 1 Drawing Sheet

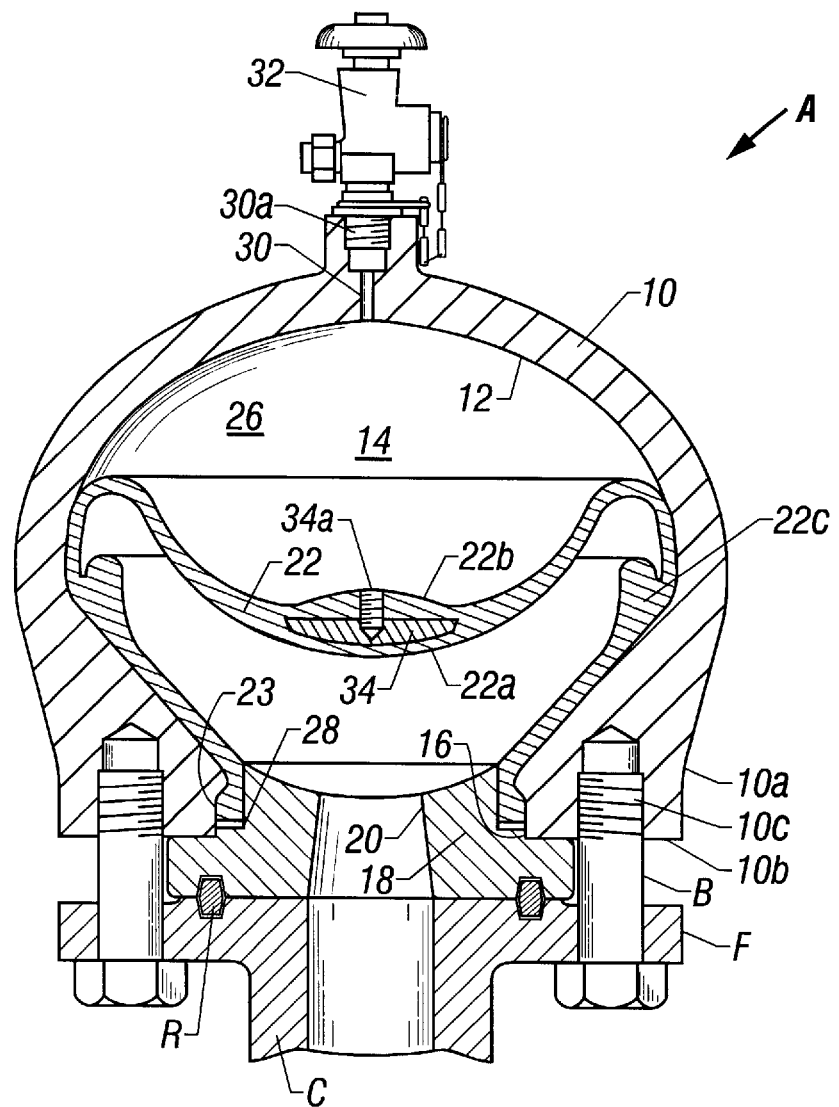

PULSATION DAMPENER DIAPHRAGM

BACKGROUND OF THE INVENTION

1. Field of the Invention

The present invention relates generally to pulsation dampeners, and more particularly to an elastomeric diaphragm for use in applications where such a dampener is exposed to a corrosive fluid and the diaphragm prevents the corrosive fluid from contacting the pressure vessel of the diaphragm.

2. The Related Art

Pulsation dampeners are typically connected in supply lines conveying fluid that is subject to surges or pulsations. For example, a reciprocating piston pump may be suitable for delivering hydraulic pressure, but creates undesirable pulsations in the process.

Such dampeners typically utilize flexible bladders or diaphragms for separating a pressure vessel into a compressible fluid zone and a zone for receiving the fluid subjected to pulsation. The diaphragm serves to dampen the pulsations as it moves back and forth in the pressure vessel. In some instances, metal inserts known as bridging disks or plates are carried by the diaphragm to provide additional support for the diaphragm at the region which covers pressure inlets.

U.S. Pat. No. 4,305,428, assigned to Hydril Co., the assignee of the present invention, describes a "surge absorber" wherein a pressurized compressible fluid, such as an inert gas, is introduced into an upper zone of a pressure vessel for absorbing pressure surges in a lower zone created by the process fluid in system flow lines. The diaphragm that separates the pressure zones includes a bridging disk that supports the diaphragm over both the process fluid inlet opening and an opening in an upper diaphragm support that permits entry of the compressible fluid into the upper zone. The bridging disk is partially encapsulated in the diaphragm, but exposes a threaded bore and a region of the disk surrounding the bore to the process fluid. Thus, the disk/diaphragm interface is exposed to the process fluid, permitting reactants in the fluid to attack the bond between the disk and the diaphragm and cause the disk to separate from the diaphragm over time. Once the disk separates, the diaphragm quickly fails without reinforcement and the pulsation dampener ceases to perform its intended function.

U.S. Pat. Nos. 4,299,253 and 4,186,776, also both assigned to Hydril Co., disclose similar structures for a pulsation dampener diaphragm, both of which include a bridging disk for supporting the diaphragm. In both of these patents, the disk and the disk/diaphragm interface are clearly exposed to the process fluid, even more so than in the '428 patent.

U.S. Pat. No. 3,674,053, also assigned to Hydril Co., discloses another similar structure to that described in the above mentioned patents, except the diaphragm of the '053 patent only covers a single fluid inlet. A bridging disk is partially encapsulated in the diaphragm, but the diaphragm again exposes a portion of the disk/diaphragm interface to the process fluid.

It is therefore an object of the present invention to identify the problem stated above, namely that exposure of a bridging insert in a pulsation dampener diaphragm to the harsh process fluid having the undesirable pulsation creates a risk that the bond between the disk and the diaphragm will deteriorate and cause the insert to separate from the diaphragm.

It is a further object of the present invention to provide a solution for this problem, in the form of completely encasing the bridging insert within the diaphragm to protect the bond between the disk and diaphragm from the process fluid so that the insert will not separate from the diaphragm.

SUMMARY

The objects described above, as well as other objects and advantages are achieved by an improved pipeline pulsation dampener, including a pressure vessel divided by a diaphragm of elastomeric material into first and second pressure zones. The first pressure zone is connected to a pipeline and receives any undesired pressure changes in a first fluid communicated by the pipeline through a first flow passage in the pressure vessel, while the second pressure zone receives a second fluid at a preselected pressure. The diaphragm prevents the fluid from contacting the pressure vessel and has a reinforcing insert for bridging the first flow passage to support the diaphragm when the pressure of the second fluid in the second pressure zone exceeds the pressure of the first fluid in the first pressure zone. The reinforcing insert is almost completely encased in the elastomeric material of the diaphragm to prevent the insert and the bond between the elastomeric material and the plate from being exposed to the fluid being pumped. In this manner, the bond is protected against corrosion or flow erosion by the first fluid.

BRIEF DESCRIPTION OF THE DRAWINGS

The FIGURE is an elevational view, taken in section, of a pulsation dampener having an improved diaphragm in accordance with the present invention.

DETAILED DESCRIPTION OF THE PREFERRED EMBODIMENT

The FIGURE illustrates a pipeline pulsation dampener, also known as a surge absorber, generally designated as A in accordance with the present invention. Dampener A includes foremost pressure vessel 10 having an inner surface 12 that defines a cavity 14. Pressure vessel 10 is provided with a first opening 16 through which an inlet nozzle 18 is secured. The inlet nozzle has flow passage 20 for providing to and delivering from vessel 10 process fluid having undesirable surges or pulses.

Flexible bladder or diaphragm 22 of elastomeric material is disposed in cavity 14 for dividing the cavity into lower or first pressure zone 24 for the pulsating fluid and upper or second pressure zone 26. Diaphragm 22 is provided with annular lip 23 for securing and sealing the diaphragm between the shell of pressure vessel 10 and inlet nozzle 18. In this manner, the diaphragm protects inner wall 12 of the pressure vessel from the harsh process fluid, by preventing the process fluid from contacting wall 12. Backup ring 28 is disposed adjacent the lower surface of diaphragm lip 23 in the space between vessel 10 and nozzle 18 so as to prevent extrusion of lip 23 that would permit it to pull free of its sealing engagement in the space under pressure applied to the diaphragm.

Preferably, cavity 14 is substantially torispherical in cross-section, but it may be formed in other shapes, such as a more cylindrical shape, with similar results. The shape of cavity 14 is, however, limited by the shape of diaphragm 22 since it is desirable that the diaphragm be uniformly supported by inner wall 12 to prevent the formation of a pressure differential across the diaphragm that would induce premature failure of the diaphragm.

Pressure vessel 10 is provided with a second opening 30 therein for communication with second pressure zone 26.

Opening 30 has internally threaded portion 30a for receiving pressure control valve 32 therein. Valve 32 functions to control the admission of a compressible fluid at a preselected pressure in upper zone 26, as described in greater detail below.

The pressure vessel is preferably of a welded steel construction and includes a thickened lower wall portion 10a about opening 16. Those skilled in the art will recognize that the pressure vessel may also be of cast steel or composite construction, depending on its intended application. Wall section 10a terminates in a downwardly facing annular surface 10b, the inner portion of which seats upon an upwardly facing annular shoulder of inlet nozzle 18. Surface 10b is equipped with a plurality of circumferentially spaced drilled and tapped bores 10c that correspond to bolt openings on mating pipe flange F for receiving bolts B in a conventional manner. Gasket ring R is disposed in opposing circular grooves in respective engaging surfaces of flange F and nozzle 18 providing a seal between the surfaces. In this manner, first pressure zone 24 beneath diaphragm 22 is connected to pipeline C and receives any undesired pressure changes in the pipeline through flow passage 20 in the inlet nozzle.

Alternatively, nozzle portion 18 could be equipped with external threads and opening 16 could be equipped with complementary internal threads, so that attachment of the nozzle to pressure vessel 10 could be accomplished by engagement of the respective threads (not shown).

The diaphragm is provided with inner surface 22a that is exposed to the pressure of the process fluid in lower zone 24 to urge the diaphragm upwardly into engagement with inner wall 12 when the pressure in lower zone 24 exceeds the pressure in upper zone 26. Conversely, when the pressure in upper zone 26 exceeds the pressure in lower zone 24, the pressure in zone 26 will urge outer surface 22b of diaphragm 22 downwardly causing the diaphragm to fold back upon itself whereby inner surface 22a is urged into engagement with inlet nozzle 18.

A bridging insert in the form of plate 34 is molded in the diaphragm so as to be almost completely encased in the elastomeric material of the diaphragm, which prevents the plate and the bond between the elastomeric material and the plate from being exposed to the process fluid. The plate is only exposed via internally threaded opening 34a that extends through the diaphragm and into the plate. The bore provides a means for engaging the plate during the manufacturing of the diaphragm, and is positioned on the side of zone 26 so that plate 34 is only exposed to the noncorrosive fluid that is admitted to the upper zone.

In this manner, the bond is protected against corrosion or flow erosion by the process fluid. Plate 34 bridges flow passage 20 to support the diaphragm when the pressure of the fluid in second pressure zone 26 exceeds the pressure of the fluid in first pressure zone 24. In this manner, the diaphragm is restrained from extruding through first flow passage 20. The reinforcing plate is formed with an arcuate lower surface that approximates the upper arcuate surface of inlet nozzle 18 for smooth engagement between diaphragm 22 and nozzle 18.

The diaphragm is further equipped with annular ring 22c molded on inner surface 22a. Ring 22c limits the back-folding of the diaphragm upon itself to prevent the diaphragm from tearing when the portion encapsulating bridge plate 34 seats upon inlet nozzle 18.

Thus, the present invention is placed in operation by positioning inlet nozzle 18 on pipe flange F with pressure vessel 10 and diaphragm 22 as generally indicated in the FIGURE. Bolts B are then inserted through the openings in flange F for engaging threaded bores 10C to secure the flange to vessel 10. Upper zone 26 is then charged to the desired operating pressure with the compressible fluid through valve 32 in a conventional manner. The compressible fluid is introduced through opening 30 in the pressure vessel and valve 32 serves as a fluid resilient means for pulsation dampener A, i.e., the valve is capable of withstanding the pressure surges. Once the upper zone is properly charged, the process fluid whose pulsations or surges are to be damped is introduced into pipeline C at a desired operating pressure. The fluid travels through nozzle 18 from pipeline C and into lower zone 24 to exert an upward force on the compressible fluid trapped in zone 26, via the diaphragm, whereby the diaphragm is moved generally to the position indicated in the FIGURE.

As the process fluid in pipeline C pulses or surges into lower pressure zone 24, erosion and/or corrosion of inlet nozzle 18 may occur. However, diaphragm 22 will protect pressure vessel 10 and bridge plate 34 from contact with the pulsating fluid. Thus, wear is limited to the inlet nozzle, because neither the bridge plate nor the vessel or its securing bolts are exposed to the pressure or corrosiveness of the process fluid.

From the foregoing, it will be seen that this invention is well adapted to attain all of the ends and objects set forth above, together with other advantages that are obvious and that are inherent to the apparatus and structure.

It will be understood that certain features and subcombinations are of utility and may be employed without reference to other features and subcombinations. This is contemplated by and is within the scope of the claims.

Because many possible embodiments may be made of the invention without departing from the scope thereof, it is to be understood that all matter set forth herein or shown in the accompanying drawings is to be interpreted as illustrative and not in a limiting sense.

What is claimed is:

1. In a pipeline pulsation dampener comprising a pressure vessel divided by a diaphragm of elastomeric material into a first pressure zone for connecting to a pipeline and receiving any undesired pressure changes in a first fluid flowing in the pipeline through a first flow passage in the pressure vessel, and a second pressure zone for receiving a second fluid through a second flow passage at a preselected pressure, the diaphragm having a reinforcing insert for bridging the first flow passage to support the diaphragm when the pressure of the second fluid in the second pressure zone exceeds the pressure of the first fluid in the first pressure zone to restrain the diaphragm from extruding through the first flow passage, the improvement comprising:

encasing the reinforcing insert in the elastomeric material of the diaphragm to prevent the insert and a bond between the elastomeric material and the insert from being exposed to the first fluid, whereby the bond is protected against corrosion or flow erosion by the first fluid.

2. A pipeline pulsation dampener comprising:

a diaphragm of elastomeric material;

a pressure vessel divided by the diaphragm into a first pressure zone and a second pressure zone; and a reinforcing insert encased in the elastomeric material of the diaphragm so as to be sealed against fluid flowing in the first pressure zone.

3. A pipeline pulsation dampener as in claim 2, further comprising a threaded bore in the diaphragm extending into the reinforcing insert from the second pressure zone side.

4. A pipeline pulsation dampener as in claim 2, further comprising an annular ring formed on an inner surface of the diaphragm on the first pressure zone side.

* * * * *